US009285493B2

(12) United States Patent
Tenghamn

(10) Patent No.: US 9,285,493 B2
(45) Date of Patent: Mar. 15, 2016

(54) SENSOR GROUPING FOR DUAL SENSOR MARINE SEISMIC STREAMER AND METHOD FOR SEISMIC SURVEYING

(75) Inventor: Stig Rune Lennart Tenghamn, Katy, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 1710 days.

(21) Appl. No.: 12/583,861

(22) Filed: Aug. 27, 2009

(65) Prior Publication Data
US 2011/0051551 A1    Mar. 3, 2011

(51) Int. Cl.
*G01V 1/38* (2006.01)
*G01V 1/36* (2006.01)

(52) U.S. Cl.
CPC ..................... *G01V 1/364* (2013.01)

(58) Field of Classification Search
CPC .......................................... G01V 1/364
USPC ........ 174/101.5; 181/112; 367/15, 20, 21, 24, 367/43, 45, 149, 152, 171, 49, 67; 702/14, 702/17
See application file for complete search history.

(56) References Cited

U.S. PATENT DOCUMENTS

| | | | |
|---|---|---|---|
| 5,163,028 A | 11/1992 | Barr et al. | |
| 5,971,095 A * | 10/1999 | Ozbek | 181/112 |
| 6,021,092 A | 2/2000 | Paffenholz et al. | |
| 6,721,662 B2 * | 4/2004 | Wood | 702/17 |
| 7,239,577 B2 * | 7/2007 | Tenghamn et al. | 367/15 |
| 7,359,283 B2 * | 4/2008 | Vaage et al. | 367/24 |
| 2008/0151689 A1 * | 6/2008 | Goujon | 367/24 |
| 2010/0172208 A1 * | 7/2010 | Belani et al. | 367/21 |
| 2010/0211320 A1 * | 8/2010 | Vassallo et al. | 702/14 |

FOREIGN PATENT DOCUMENTS

| | | | | |
|---|---|---|---|---|
| GB | 2458642 A * | 9/2009 | | G01V 1/28 |
| RU | 28923 U1 | 1/2003 | | |
| WO | WO 03/025624 | 3/2003 | | |
| WO | WO 2005/096018 A1 | 10/2005 | | |

OTHER PUBLICATIONS

Definiton of "frequency," downloaded from Dictionary.com Jun. 5, 2013.*
Examiner, L.I. Popova, Eurasian Search Report, mailing date: Nov. 25, 2010.

* cited by examiner

*Primary Examiner* — Daniel L Murphy

(57) ABSTRACT

A method for marine seismic surveying includes towing a streamer in a body of water. The streamer includes a plurality of spaced apart sensor groups, each including a plurality of longitudinally spaced apart pressure sensors and particle motion responsive sensors. Signals are detected at each of the sensors in response to actuation of a seismic energy source. Components of the sampled motion signals in each group above a selected frequency are combined to generate respective group motion signals. Components of the motion responsive signals below the selected frequency are velocity filtered. The velocity filtered signals are combined with the group motion signals to generate full bandwidth motion responsive signals corresponding to each sensor group.

10 Claims, 3 Drawing Sheets

SENSOR GROUPING FOR DUAL SENSOR MARINE SEISMIC STREAMER AND METHOD FOR SEISMIC SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey systems. More specifically, the invention relates to structures for sensor groups in marine seismic streamers having particle motion sensors and pressure sensors.

2. Background Art

Marine seismic survey systems known in the art include sensor cables called "streamers" towed in a body of water to acquire seismic signals resulting from actuation at selected times of one or more seismic energy sources in the water. Streamers include a plurality of seismic sensors disposed at spaced apart locations along the streamer. Typically, the sensors are arranged in a plurality of spaced apart groups or "arrays", wherein in each such group or array a selected number of sensors are disposed at relatively close spacing (e.g., 0.7 meters), and the signals from all the sensors in the group are combined in some manner to generate the equivalent of a single sensor signal. The sensor groups may be separated from each other by a relatively longer spacing (e.g., 12.5 meters) to provide the equivalent of signals from a plurality of individual sensors disposed at spaced apart locations along the streamer. Sensor grouping and signal combination as explained above is used to reduce certain types of noise in the signals detected by the seismic sensors.

One type of seismic streamer known in the art called a "dual sensor" streamer includes both particle motion responsive sensors (e.g., geophones) and pressure or pressure time gradient responsive sensors (e.g., hydrophones) disposed in substantially collocated groups. One example of such type of streamer is disclosed in U.S. Pat. No. 7,239,577 issued to Tenghamn et al. and commonly owned with the present invention. The particular uses for such dual sensor streamers are well described in the foregoing patent.

It is known in the art that in seismic streamers having particle motion sensors, including dual sensor streamers, the particle motion sensors are susceptible to noise generated by the movement of the streamers in the water. One technique for processing dual sensor seismic streamer signals that takes account of such noise is described in U.S. Pat. No. 7,359,283 issued to Vaage et al. and commonly owned with the present invention. The method described in the foregoing patent includes synthesizing low frequency (e.g., below about 20 Hz) particle motion signals using signals from the pressure responsive sensors, and adding the synthesized low frequency components to measurements made by the particle motion sensors above the synthesized signal frequency limit. Particle motion signals measured by the particle motion sensors below the synthesis frequency limit are effectively not used in such method. As a result, potentially valuable low frequency particle motion information may be unobtainable.

One way to reduce noise in the lower part of the seismic frequency band in signals detected by the motion sensors is to use single sensor measurements. To do this it is necessary to have relatively densely spaced sensors that preferably are equally spaced over the group length. Such sensor arrangements have not been practicable due to limitations of power consumption along the streamer and limitations in handling large volumes of sensor data.

There continues to be a need for improved structures and signal processing techniques for seismic streamers including particle motion sensors that can attenuate the effects of motion induced noise in the particle motion sensor signals.

SUMMARY OF THE INVENTION

A method for marine seismic surveying according to one aspect of the invention includes towing a streamer in a body of water. The streamer includes a plurality of spaced apart sensor groups, each including a plurality of longitudinally spaced apart pressure sensors and particle motion responsive sensors. Signals are detected at each of the sensors in response to actuation of a seismic energy source. Components of the sampled motion signals in each group above a selected frequency are combined to generate respective group motion signals. Components of the motion responsive signals below the selected frequency are velocity filtered. The velocity filtered signals are combined with the group motion signals to generate full bandwidth motion responsive signals corresponding to each sensor group.

Other aspects and advantages of the invention will be apparent from the following description and the appended claims.

DETAILED DESCRIPTION

Figure 1:
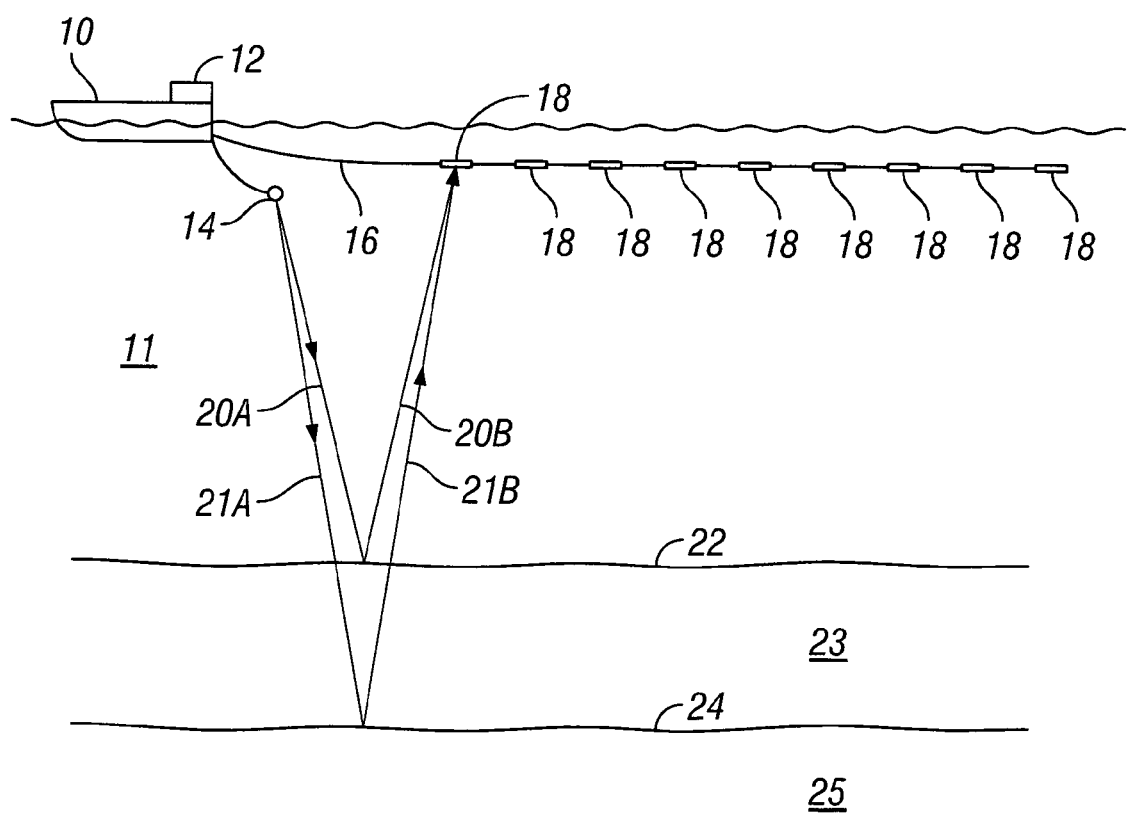
FIG. 1 shows an example of a seismic survey vessel towing an example streamer according to the invention.

An example seismic acquisition system is shown schematically in FIG. 1. The system includes a seismic survey vessel 10 that moves along the surface of a body of water 11 such as a lake or the ocean. The seismic survey vessel 10 may include thereon equipment shown generally at 12 and referred to for convenience as a "recording system" that includes devices (none shown separately) for, among other functions, determining geodetic position of the vessel 10, for controlling actuation of one or more seismic energy sources 14 (explained further below), and for detecting and making a time indexed record of signals detected by seismic sensors disposed at spaced apart locations along one or more seismic sensor streamers 16. The recording system 12 may include a general purpose, programmable computer (not shown separately) for processing signals according to techniques to be further explained below.

The streamer 16 may be towed by the seismic survey vessel 10 or by another vessel (not shown). Only one streamer 16 is shown in FIG. 1 for clarity of the illustration, however, it will be appreciated by those skilled in the art that typically a plurality of such streamers will be towed by the survey vessel 10 or by another vessel using certain towing equipment (not shown) to maintain the streamers in selected lateral positions with respect to each other and with respect to the center line of the towing vessel, e.g., the survey vessel 10.

The one or more seismic energy sources 14 may be towed by the seismic survey vessel 10 or by another vessel (not shown). The one or more seismic energy sources 14 may be air guns, water guns, marine vibrators or arrays of such devices. The one or more seismic energy sources 14 are actuated at selected times and energy therefrom travels through the water 11 generally downwardly as shown at 20A and 21A until it reaches the water bottom 22 and one or more acoustic impedance boundaries 24 in the formations 23, below the water bottom 22. Reflected seismic energy travels generally upwardly, shown at 20B and 21B and is detected by seismic sensors (explained below with reference to FIG. 2) in the streamer 16. In the present example, the seismic sensors may be disposed in a plurality of longitudinally spaced apart sensor groups 18. The recording system 12 may make recordings of the detected seismic signals generally indexed with respect to the actuation time of the one or more seismic energy sources 14.

Figure 2:
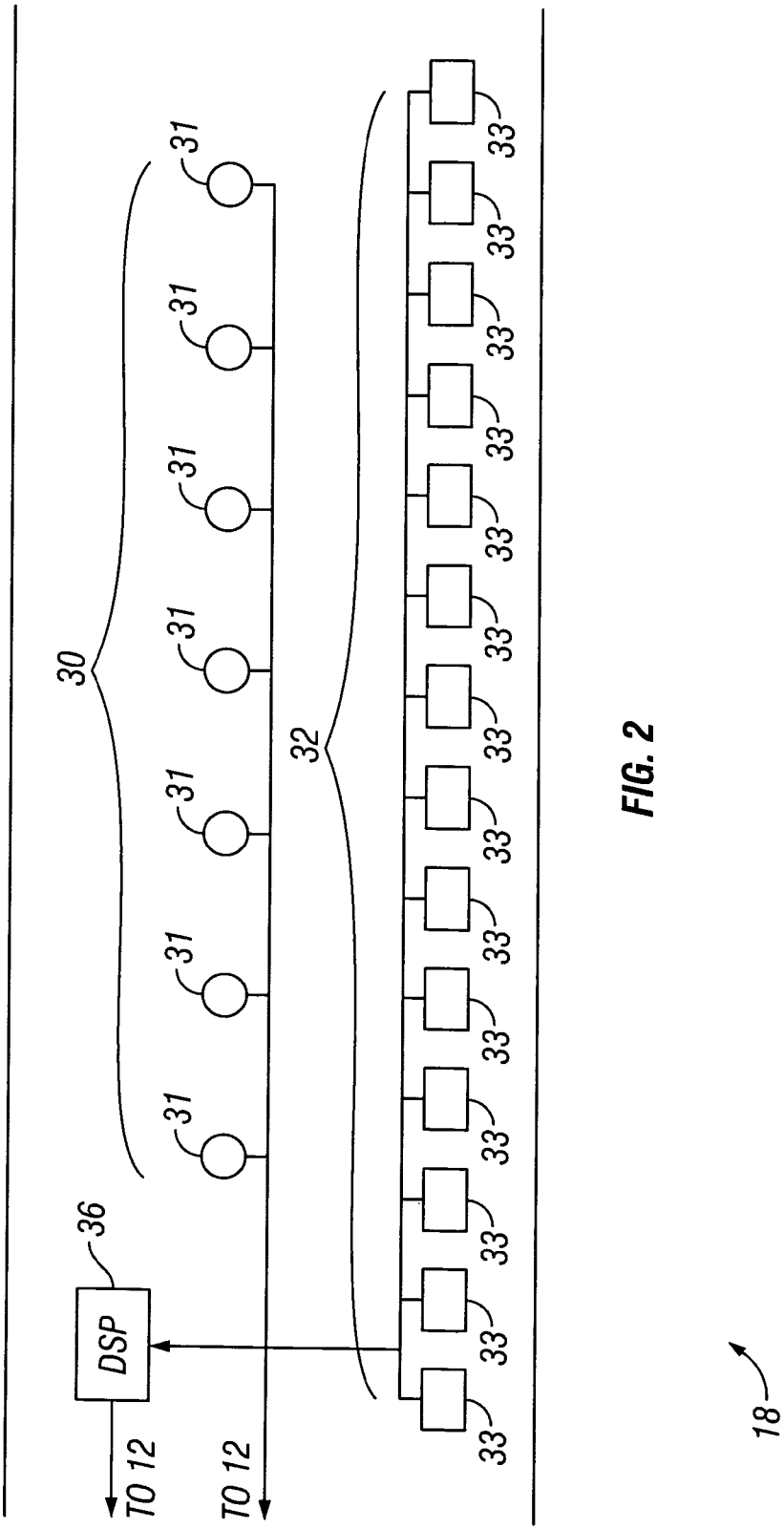
FIG. 2 shows an example sensor group for the streamer shown in FIG. 1.

FIG. 2 shows an example of a seismic sensor group 18. The seismic sensor group 18 may include a plurality of individual pressure responsive or pressure time gradient responsive sensors 31 disposed at selected spacing (e.g., 0.5 meters) from each other to form a pressure responsive or pressure time gradient responsive sensor group 30 ("pressure sensor group"). The individual sensors 31 ("pressure sensors") in the pressure sensor group 30 may be, for example, hydrophones that generate an electrical or optical signal in response to pressure or pressure time gradient. In some examples, the signals from the individual pressure sensors 31 in the pressure sensor group 30 may be combined by electrically or optically connecting the signal output of individual pressure sensors 31 such that the pressure sensor group 30 effectively generates one pressure responsive signal that may be communicated to the recording system (12 in FIG. 1). The pressure responsive signal from the pressure sensor group 30 may be communicated in analog form or may be digitized at some location (not shown) along the streamer (16 in FIG. 1) using an analog to digital converter (not shown). In some examples, there may be sixteen pressure sensors 31 in each pressure sensor group 30, although the exact number of pressure sensors in each pressure sensor group is not a limit on the scope of the present invention.

The sensor group 18 may also include a plurality of spaced apart particle motion responsive sensors 33 that collectively form a particle motion responsive sensor group 32 ("motion sensor group"). The particle motion responsive sensors 33 ("motion sensors") may be geophones, velocity meters, accelerometers, or any other particle motion sensitive device known in the art. The motion sensors can be 1, 2 or 3 axis sensors. The motion sensors 33 may be arranged such that the longitudinal center of the motion sensor group 32 is approximately collocated with the longitudinal center of the pressure sensor group 30. In the present example there may be thirty or more motion sensors 33 in the motion sensor group 32.

In the present example, the motion sensors 33 may be three axis, microelectrical-mechanical systems ("MEMS") accelerometers. One non-limiting example of a MEMS accelerometer that may be used in some examples is sold under model designation MTi by XSENS, Pantheon 6a, 7521 PR, ENSCHEDE, The Netherlands. Another non-limiting example of MEMS accelerometer is sold under model designation ADXL50 by Analog Devices, Inc., 3 Technology Way, Norwood, Mass. 02062. Such accelerometers have detecting elements responsive to acceleration along each of three generally orthogonal directions. The motion sensors 33 may generate an electrical or optical signal related to the amount of acceleration applied along the sensitive axis of each detecting element. A possible benefit of using devices such as MEMS accelerometers as the motion sensors 33 is that their small size, weight and electrical power consumption makes possible the use of relatively large numbers of motion sensors 33 in the motion sensor group 31. In the present example, the motion sensors 33 may be substantially evenly spaced apart from each other, including between adjacent sensor groups 18 along the streamer (16 in FIG. 1). Using relatively large numbers of motion sensors 33 in each motion sensor group 31, and the foregoing even spacing, may make possible certain types of signal processing that will be further explained below.

The motion sensor group 32 may have associated therewith at a convenient position proximate the motion sensor group 32 a signal processing unit 36 such as a mixed signal digital signal processor. The signal processing unit 36 may include an internal multiplexer (not shown separately) that enables separate detection and processing of the signals from each detecting element (not shown separately) in each motion sensor 33 and analog to digital conversion circuitry (not shown separately). The signal processing unit 36 may also be programmed to calculate, from the signals from each detecting element in each motion sensor 33, either or both the vertical component of the motion wavefield at each motion sensor 33 and the total motion wavefield at each motion sensor 33. It is possible to calculate the vertical component of the motion wavefield using the described accelerometers because there are two or three orthogonal detecting elements, thus making possible determination of the component of acceleration resulting from Earth's gravity that is detected by each detecting element. The gravity orientation of each motion sensor 33 may thus be determined, enabling resolution of the vertical component of the motion wavefield. Signals output from the signal processing unit 36 may be conducted to the recording system (12 in FIG. 1) for processing as will be further explained.

Typically, a streamer such as shown at 16 in FIG. 1 extends behind the towing vessel for several kilometers, and may include several hundred or more sensor groups (18 in FIG. 2) such as explained above. Because of the resulting very large number of individual seismic sensors present in the typical streamer, in an example signal processing technique according to the invention, signals from the individual motion sensors (33 in FIG. 2) may be processed to reduce the volume of signal data communicated to the recording system (12 in FIG. 1), while at the same time processing signals from the individual motion sensors (33 in FIG. 2) such that motion induced noise may be attenuated therefrom. Attenuation of the motion induced noise may enable determination of low frequency seismic signal components from the motion sensor signals. The terms "low frequency" and "high frequency" as used in the present description are intended to mean frequencies below and above, respectively, a selected frequency threshold below which substantial motion induced noise is present in the signals from the motion sensors (33 in FIG. 2). Such frequency threshold is explained in the Vaage et al. '283 patent referred to in the Background section herein, and is typically in the range of 20 Hz to 30 Hz.

Figure 3:
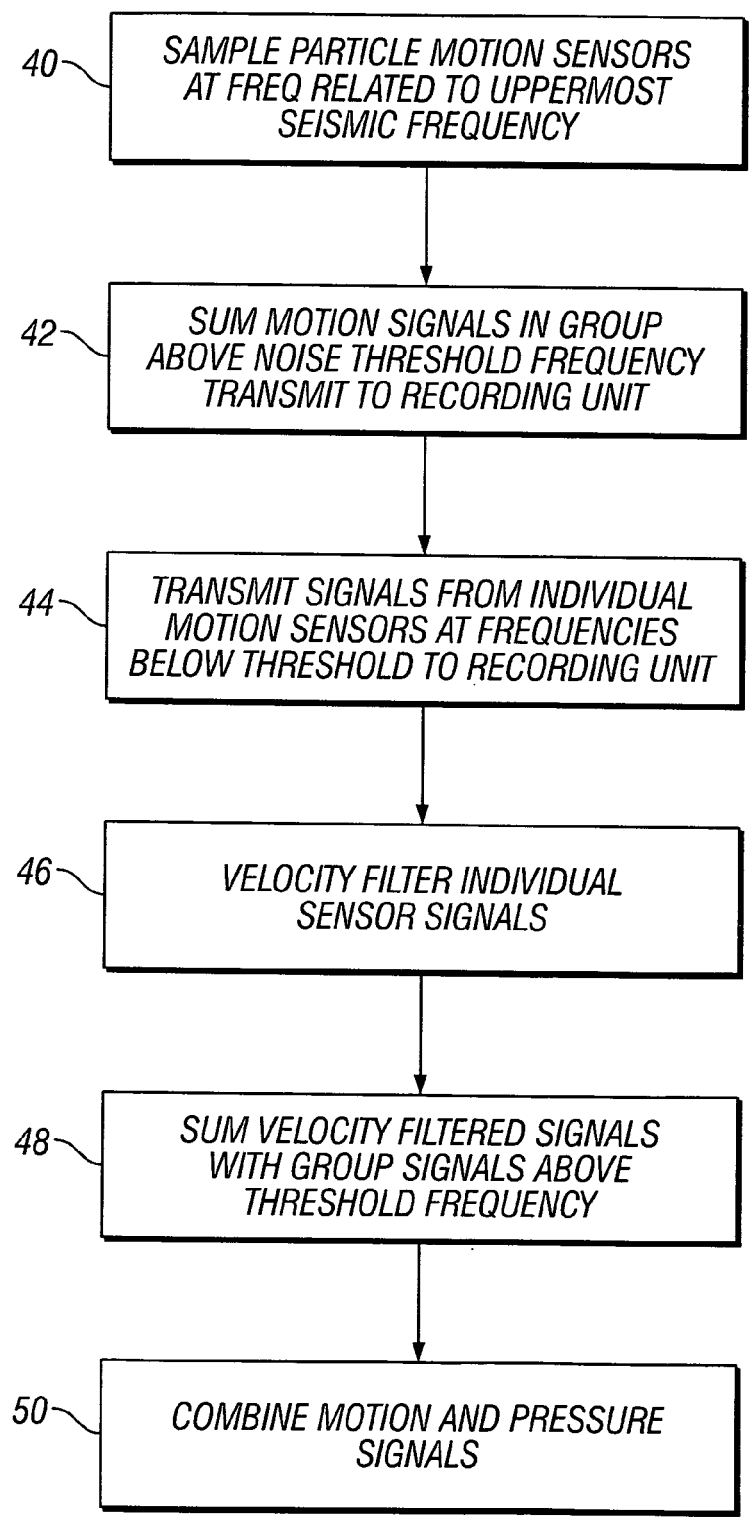
FIG. 3 shows a flow chart of an example signal processing method using the streamer shown in FIG. 1 having sensor groups as shown in FIG. 2.

FIG. 3 shows a flow chart of an example signal detection and processing technique according to the invention. At 40, the signal processing unit (36 in FIG. 2) may digitize and sample the signal output of each sensing element in each motion sensor (33 in FIG. 2) at a sample rate related to an uppermost frequency in a seismic frequency range of interest.

For example, such sample rate may be 200 to 400 Hz for an upper seismic frequency limit of 100 Hz to 200 Hz. At 42, the digitally sampled motion sensor signals may be separated into low frequency component signals and high frequency component signals, using a selected frequency threshold as explained above. The high frequency component signals from all the motion sensors (33 in FIG. 2) in each motion sensor group (32 in FIG. 2) may be combined, added or summed to generate a single group motion sensor signal. The group motion sensor signal may be the vertical component of the motion wavefield, the summed vertical and crossline component, or may be the total motion wavefield, as explained above. Calculation of either of the foregoing motion wavefields may be performed in the signal processing unit (36 in FIG. 2). The group motion signals thus determined may be communicated to the recording system (12 in FIG. 1) at the selected digital sampling rate.

At 44, the low frequency component signals from each individual motion sensor (33 in FIG. 2) may be communicated to the recording system (12 in FIG. 1). In one example, such communication may be at a lower sample rate related to the threshold frequency. For example, if the threshold frequency is 20 Hz, the low frequency components of the individual motion sensor signals may be communicated to the recording system (12 in FIG. 1) at a sample rate of 40 Hz. Such lower frequency communication may preserve streamer telemetry capacity for other signals, e.g., the high frequency component signals.

The foregoing signals communicated to the recording system (12 in FIG. 1) may be further processed as explained below on the computer in the recording system (12 in FIG. 1), or on another programmable computer (that may be located elsewhere) using as signal input the signal recordings made in the recording unit (12 in FIG. 1).

At 46, the low frequency component of the individual motion sensor signals may be velocity filtered. Such velocity filtering may be, for example, frequency-wavenumber (f-k) filtering, or slant stack (tau-p) filtering. A velocity threshold for the velocity filtering may be selected to exclude from the signals any components having slower velocity than the speed of sound in water (about 1500 meters per second). It is expected that motion induced noise has slower velocity than the speed of sound in water. Velocity filtering is made practical by the use of the relatively large number of motion sensors (33 in FIG. 2) and their substantially even spacing therebetween.

At 48, the velocity filtered low frequency component signals from each motion sensor group (32 in FIG. 1) may then be summed. The summed low frequency component signals from each group may then be summed with the high frequency component signals from the same motion sensor group to produce a full bandwidth motion sensor signal for each motion sensor group. The full bandwidth motion sensor signals may be relatively free of motion induced noise.

At 50, the full bandwidth motion signals from each motion sensor group may be combined with the pressure sensor group signals from each corresponding pressure sensor group in any manner known in the art for combined motion and pressure signal processing. See, for example, U.S. Pat. No. 6,021,092 issued to Paffenholz et al., or U.S. Pat. No. 5,163, 028 issued to Barr et al. Such combination may produce, for example, seismic signals in which effects of seismic energy reflection from the water surface have been attenuated. Such seismic signals may be referred to as "deghosted" seismic signals.

In another example, wherein telemetry capacity in the streamer (16 in FIG. 1) is not limited, it is possible to send the full bandwidth signal from each individual motion sensor (33 in FIG. 2) and each individual pressure sensor (31 in FIG. 2) to the recording unit (12 in FIG. 1) for recording. Processing the signals as explained with reference to FIG. 3 may be performed on the computer in the recording unit or on another computer. In the present example, however, the motion sensor group signal may be generated by separating the full bandwidth motion sensor signals into high frequency and low frequency components, as previously explained, at a selected frequency related to a frequency limit of substantial motion induced noise. The high frequency component signals from the motion sensors in each group (32 in FIG. 2) may be combined or added in the computer, rather than by the signal processing unit (36 in FIG. 2) as explained with reference to FIG. 2. The low frequency components may be velocity filtered as explained above, and the remainder of the processing may be performed as explained above with reference to FIG. 3. Similarly, the pressure signals from individual pressure sensors may be combined to generate a pressure sensor group signal for each pressure sensor group (30 in FIG. 2) in the computer.

Methods and systems according to the invention may provide improved seismic data because the effects of noise on the low frequency portion of particle motion sensor signals is substantially reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for marine seismic surveying, comprising:
   towing at least one seismic streamer in a body of water, the streamer including a plurality of spaced apart sensor groups, each sensor group including a plurality of longitudinally spaced apart particle motion responsive sensors;
   detecting signals at each of the particle motion responsive sensors in response to actuation of a seismic energy source;
   summing components of the signals from each group above a selected frequency to generate respective group motion signals;
   velocity filtering components of the signals from each group below the selected frequency to generate respective group velocity filtered signals; and
   combining the group velocity filtered signals with the group motion signals to generate full bandwidth motion responsive signals corresponding to each sensor group.

2. The method of claim 1 wherein the velocity filtering comprises excluding signal components below a velocity of sound in water.

3. The method of claim 1 wherein the velocity filtering comprises frequency-wavenumber filtering.

4. The method of claim 1 wherein the velocity filtering comprises slant stack filtering.

5. The method of claim 1 wherein the components of the motion signals below the selected frequency are communicated to a recording system at a sample rate related to the selected frequency, the sample rate lower than a digital sample rate related to an upper limit of a seismic frequency range of interest.

6. The method of claim 1 wherein the selected frequency is related to a frequency of towing motion induced noise in the motion responsive sensor signals.

7. The method of claim 6 wherein the selected frequency is about 20 Hz.

8. The method of claim 1 wherein the at least one streamer comprises a plurality of pressure responsive sensor groups each substantially collocated with a corresponding particle motion responsive sensor group, and wherein the method further comprises:
   detecting pressure responsive signals in response to actuation of the seismic energy source; and
   combining the pressure responsive signals with the full bandwidth motion responsive signals to generate deghosted seismic signals.

9. The method of claim 1 wherein the detected motion responsive signals are digitally sampled in the streamer at a rate corresponding to a maximum seismic frequency of interest, and wherein the motion responsive signals below the selected frequency are communicated to a recording system at a sample rate related to the selected frequency and lower than the digital sampling rate.

10. The method of claim 1 wherein the motion responsive signal components above the selected frequency are combined in the streamer to generate the respective group motion responsive signals, and the respective group motion responsive signals are communicated from the streamer to a recording system.

* * * * *